United States Patent
Choi et al.

(10) Patent No.: US 9,455,583 B2
(45) Date of Patent: Sep. 27, 2016

(54) BATTERY PACK, ELECTRONIC APPARATUS INCLUDING THE SAME, AND METHOD OF CONTROLLING CHARGE

(71) Applicant: SAMSUNG Electronics Co., Ltd., Suwon-si, Gyeonggi-do (KR)

(72) Inventors: Hyung-wook Choi, Seoul (KR); In-sung Hwang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 211 days.

(21) Appl. No.: 14/310,214

(22) Filed: Jun. 20, 2014

(65) Prior Publication Data
US 2015/0188326 A1    Jul. 2, 2015

(30) Foreign Application Priority Data

Dec. 30, 2013 (KR) .................. 10-2013-0166389

(51) Int. Cl.
*H02J 7/00* (2006.01)

(52) U.S. Cl.
CPC .............. *H02J 7/0029* (2013.01); *H02J 7/008* (2013.01); *H02J 7/0086* (2013.01); *H02J 7/0091* (2013.01); *H02J 7/0047* (2013.01); *H02J 2007/0039* (2013.01)

(58) Field of Classification Search
CPC ...... H02J 7/0047; H02J 7/008; H02J 7/0086; H02J 7/0091; H02J 7/045
USPC ........................................................ 320/112
See application file for complete search history.

(56) References Cited

U.S. PATENT DOCUMENTS

| | | | | |
|---|---|---|---|---|
| 5,677,077 A * | 10/1997 | Faulk | .................... | H02J 7/0021 324/433 |
| 5,721,481 A * | 2/1998 | Narita | .................... | H02J 7/0013 307/46 |
| 6,037,750 A * | 3/2000 | Von Novak | ............ | H02J 7/0011 320/128 |
| 6,489,751 B2 * | 12/2002 | Small | .................... | H01M 2/1055 320/150 |
| 7,808,212 B2 * | 10/2010 | Litingtun | .............. | H02J 7/0031 320/134 |
| 8,493,034 B2 * | 7/2013 | Aiura | ..................... | H02J 7/0091 320/150 |
| 2010/0181966 A1 * | 7/2010 | Sakakibara | ............... | B25F 5/00 320/136 |
| 2010/0315037 A1 * | 12/2010 | Aiura | ..................... | H02J 7/0047 320/107 |
| 2011/0193525 A1 * | 8/2011 | Ro | ........................ | H02J 7/0016 320/116 |
| 2012/0206102 A1 * | 8/2012 | Okamura | ............ | H01M 10/425 320/112 |
| 2013/0193924 A1 * | 8/2013 | Kurokawa | ............ | H02J 7/0029 320/112 |
| 2013/0229151 A1 * | 9/2013 | Okada | ................... | H01M 10/44 320/112 |
| 2014/0302377 A1 * | 10/2014 | Naito | .................... | H01M 2/105 429/156 |

* cited by examiner

*Primary Examiner* — Sun Lin
(74) *Attorney, Agent, or Firm* — Staas & Halsey LLP (57) ABSTRACT

A battery pack, which supplies power to an electronic apparatus, includes a battery cell, a charger configured to receive power from an external source, and charge the battery cell by using the supplied power, and a charge controller configured to, when a voltage of the battery cell is lower than a predetermined first voltage even though the battery cell has a problem, control the charger to charge the battery cell.

20 Claims, 10 Drawing Sheets
(1 of 10 Drawing Sheet(s) Filed in Color)

| | DETERMINE WHETHER CHARGING OPERATION IS POSSIBLE |
|---|---|
| BEFORE CHARGING | VOLTAGE OF BATTERY CELL IS LOWER THAN PREDETERMINED OVER DISCHARGING VOLTAGE |
| | VOLTAGE OF BATTERY CELL SHALL BE LOWER THAN PREDETERMINED OVER CHARGING VOLTAGE |
| | TEMPERATURE OF BATTERY CELL IS IN PREDETERMINED CHARGING TEMPERATURE RANGE |
| DURING CHARGING | DETERMINE WHETHER TO STOP CHARGING OPERATION HIGHER THAN PREDETERMINED CHARGING VOLTAGE |
| | TEMPERATURE OF BATTERY CELL IS IN PREDETERMINED CHARGING TEMPERATURE RANGE |
| | CHARGING CURRENT HIGHER THAN PREDETERMINED CURRENT LEVEL SHALL NOT FLOW INTO BATTERY CELL |

BATTERY PACK, ELECTRONIC APPARATUS INCLUDING THE SAME, AND METHOD OF CONTROLLING CHARGE

CROSS-REFERENCE TO RELATED APPLICATIONS

This application claims priority under 35 U.S.C. §119 from Korean Patent Application No. 10-2013-0166389, filed on Dec. 30, 2013 in the Korean Intellectual Property Office, the disclosure of which is incorporated herein by reference in its entirety.

BACKGROUND OF THE INVENTION

1. Field of the Invention

The present general inventive concept generally relates to a battery pack, an electronic apparatus including the same, and a method of controlling charging, and more particularly, to a battery pack which is capable of preventing deformation of a battery due to over discharge, an electronic apparatus including the same, and a method of controlling charging.

2. Description of the Related Art

A portable electronic apparatus such as a notebook Personal Computer (PC), a convertible notebook PC, a tablet PC, a smart phone, and the like is equipped with a battery pack that is a power supply device. As a recent electronic apparatus provides mobility and a light weight short small design, an embedded lithium ion battery has been employed.

A lithium ion battery cell may be roughly divided into a cylinder-shaped battery cell, a square-shaped battery cell, and a polymer cell, and swelling may occur under an abnormal condition due to chemical characteristics of a battery. It is reported that the swelling occurs the most in a polymer cell whose cell case is made of a pouch material, not a metal material, and occurs often in a square-shaped cell as well. Such swelling usually occurs under such three abnormal conditions as over charge, over discharge, and exposure to a high temperature.

Herein, the swelling due to the over discharge may occur when a user does not use an electronic apparatus for a long time, but may occur when the user uses the electronic apparatus.

To be specific, when an abnormal condition of a battery cell is sensed and a protective circuit (specially, a fuse) operates, a current inflow to the battery cell is cut off by the operation of the fuse. In this case, the user should visit an after-sales service center and replace the battery pack. However, the electronic apparatus may operate when it is connected to a charger, and thus, there are some users to continuously use the electronic apparatus without replacing the battery pack.

However, when the electronic apparatus is used for a long time in such a state, the battery cell where the current inflow is cut off may be over discharged due to a natural discharge, which may result in the swelling. Particularly, in a case of an embedded lithium ion battery pack, the other components within the electronic apparatus may be damaged due to the swelling of the battery pack.

SUMMARY OF THE INVENTION

The present general inventive concept provides a battery pack which is capable of preventing deformation of a battery due to an over discharge, an electronic apparatus including the same, and a method of controlling charging the battery.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a battery pack including a battery cell, a charger configured to receive power from an external source and to charge the battery cell by using the supplied power, and a charge controller configured to control the charger to charge the battery cell, when a voltage of the battery cell is lower than a predetermined first voltage, even though the battery cell has a problem.

In this case, when the voltage of the battery cell is lower than the predetermined first voltage, the charge controller may control the charger to charge the battery cell only until the voltage of the battery cell reaches a predetermined second voltage which is higher than the first voltage.

Meanwhile, when the voltage of the battery cell is lower than the predetermined first voltage, the charge controller may control the charger to charge the battery cell only for a predetermined time.

In addition, only when the voltage of the battery cell is lower than the predetermined first voltage, and a temperature of the battery cell is in a predetermined temperature range, the charge controller may control the charger to charge the battery cell.

The charge controller may determine whether the battery cell has a problem based on the voltage and the temperature of the battery cell.

The battery pack includes a plurality of battery cells connected to each other in series. In addition, even when a voltage of at least one of the plurality of battery cells is lower than the first voltage, and when a voltage of at least one of the other battery cells is higher than a predetermined third voltage, the battery pack may control the charger not to charge the plurality of battery cells.

Meanwhile, the charger may include a first charging unit configured to supply a current to the battery cell by a predetermined first current level by using the power from the external source, a second charging unit configured to supply a current to the battery cell by a second current level which is lower than the first current level, by using the power from the external source, and a fuse configured to, when the battery cell has a problem, cut off power supply to the first charging unit. In addition, when the battery cell has a problem, the charge controller may control the fuse not to supply external power to the first charging unit, and when the voltage of the battery cell is lower than the predetermined first voltage even though the battery cell has a problem, the charge controller may control the second charging unit to charge the battery cell.

In this case, the second charging unit may output a current in a range of 10 mA to 999 mA.

The battery pack may further include a second charge controller configured to, when the battery cell satisfies a predetermined condition, control the fuse not to supply external power to the first charging unit.

Meanwhile, the battery pack may further include a plurality of terminals configured to receive power from the external source. The first charging unit may include one end which is connected to one end of the fuse and the other end which is connected to one end of the battery cell. In addition, the second charging unit may include one end which is connected to one of the plurality of terminals and the other end which is connected to the one end of the battery cell, and the battery cell may include the other end which is connected to another one of the plurality of terminals.

The battery cell may be a lithium ion cell.

The foregoing and/or other features and utilities of the present general inventive concept may be achieved by providing an electronic apparatus including a user interface configured to receive a user command, a controller configured to control the user interface to perform a calculation according to the received user command, and to display a screen according to the calculation, and a power supply configured to supply power to the user interface and the controller by using power provided from an external source and power charged in the battery pack. In addition, when a voltage of the battery cell is lower than a predetermined first voltage even though the battery cell has a problem, the battery pack may charge the battery cell.

In this case, the battery pack may include a battery cell, a first charging unit configured to supply a current to the battery cell by a predetermined first current level by using the power from the external source, a second charging unit configured to supply a current to the battery cell by a second current level which is lower than the first current level by using the power from the external source, a fuse configured to, when the battery cell has a problem, cut off power supply to the first charging unit, and a charge controller configured to, when the battery cell has a problem, control the fuse not to supply external power to the first charging unit, and when the voltage of the battery cell is lower than the predetermined first voltage even though the battery cell has a problem, control the second charging unit to charge the battery cell.

When the voltage of the battery cell is lower than the predetermined first voltage, the charge controller may control the charger to charge the battery cell only until the voltage of the battery cell reaches a predetermined second voltage which is higher than the first voltage.

Meanwhile, the battery pack may include a plurality of battery cells connected to each other in series. In addition, even when a voltage of at least one of the plurality of battery cells is lower than the first voltage, and when a voltage of at least one of the other battery cells is higher than a predetermined third voltage, the charge controller may control the charger not to charge the plurality of battery cells.

Meanwhile, when the battery cell malfunctions, the charge controller may notify a malfunction problem of the battery cell to the controller.

The foregoing and/or other features and utilities of the present general inventive concept may also be achieved by providing a method of controlling charging a battery pack to supply power to an electronic apparatus, the method including sensing a voltage and a temperature of a battery cell, determining whether the battery cell has a problem based on the sensed voltage and temperature, and selectively charging the battery cell according to whether the battery cell has a problem. In addition, when the voltage of the battery cell is lower than a predetermined first voltage even though the battery cell has a problem, the selectively charging may include charging the battery cell.

In this case, when the voltage of the battery cell is lower than the predetermined first voltage, the selectively charging may include charging the battery cell only until the voltage of the battery cell reaches a predetermined second voltage which is higher than the first voltage.

When the voltage of the battery cell is lower than the predetermined first voltage, the selectively charging may include charging the battery cell only for a predetermined time.

Meanwhile, the battery pack may include a plurality of battery cells connected to each other in series. In addition, when a voltage of at least one of the plurality of battery cells is lower than the first voltage, and a voltage of at least one of the other battery cells is higher than a predetermined third voltage, the selectively charging may include not charging the plurality of battery cells.

The foregoing and/or other features and utilities of the present general inventive concept may also be achieved by providing a computer-readable medium containing computer-readable codes as a program to execute the method described above or hereinafter.

The foregoing and/or other features and utilities of the present general inventive concept may also be achieved by providing an electronic apparatus including the battery pack described above or hereinafter. The electronic apparatus may further include a controller to display the charging state of the battery cell of the battery pack on a screen of a user interface.

The foregoing and/or other features and utilities of the present general inventive concept may also be achieved by providing a battery pack usable in an electronic apparatus, the battery pack including a battery cell, a charger to charge the battery cell with at least one of a plurality of charging currents according to a voltage level of the battery cell and at least one of a plurality of predetermined voltages, and a charge controller configured to control the charger to charge the battery cell with a lowest one of the plurality of charging currents when the voltage level of the battery is lower than a lowest one of the predetermined voltages.

The lowest one of the plurality of charging currents may be a micro charging current which is lower than a tenth of a highest one of the plurality of charging currents.

The charge controller may control the charger to charge the battery cell with the lowest one of the plurality of charging currents according to at least one of a predetermined charging period, a charging level of the battery cell, and a temperature level of the battery cell.

The battery cell may have an abnormal characteristic in which the battery cell is prevented from being changed with the other charging currents.

The charge controller may control the charger to charge the battery cell until the voltage level of the battery cell reaches one of middle ones of of the plurality of predetermined voltages.

BRIEF DESCRIPTION OF THE DRAWINGS

The patent or application file contains at least one drawing executed in color. Copies of this patent or patent application publication with color drawings will be provided by the Office upon request and payment of the necessary fee.

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
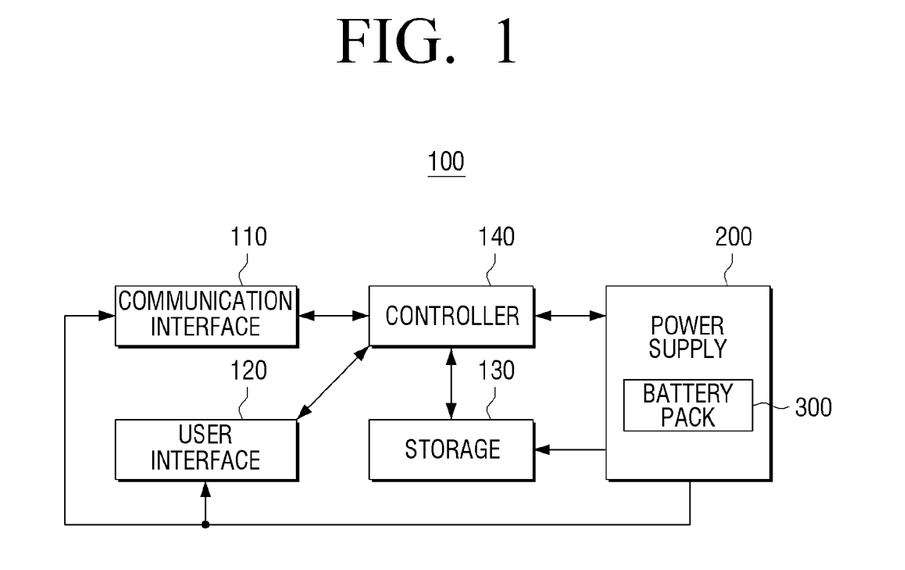
FIG. 1 is a block diagram illustrating an electronic apparatus according to an exemplary embodiment of the present general inventive concept.

FIG. 1 is a block diagram illustrating an electronic apparatus 100 according to an exemplary embodiment of the present general inventive concept.

Referring to FIG. 1, the electronic apparatus 100 according to an exemplary embodiment includes a communication interface 110, a user interface 120, a storage 130, a controller 140, and a power supply 200. Herein, the electronic apparatus 100 may be a notebook PC, a tablet PC, a MP3 Player, a smart phone, a mobile phone, a Portable Multimedia Player (PMP), and the like which operate by a battery.

The communication interface 110 is configured to connect the electronic apparatus 100 to an external apparatus (not illustrated), and may be connected to the external apparatus through a wireless communication method (for example, General System/Standard for Mobile Communication (GSM), Universal Mobile Telephone System (UMTS), Long Term Evolution (LTE), Wireless Broadband Internet (Wi-Bro), etc.) as well as a Local Area Network (LAN) and an internet network.

The user interface 120 may include a plurality of function keys which enables a user to set or select various functions supported by the electronic apparatus 100, and display various pieces of information provided by the electronic apparatus 100. The user interface 120 may be implemented as an apparatus where an input and output are performed simultaneously like a touch screen or panel, or may be implemented as a combination of an input device such as a mouse and an output device such as a monitor.

The storage 130 is a storage device which stores program commands and materials (or data) required by the controller 140 while the electronic apparatus 100 operates. The storage 130 may directly access to a memorized location in response to a command of a central processing unit or the controller 140 and perform a reading operation and a writing operation.

In addition, the storage 130 stores a program for operating the electronic apparatus 100. The storage 130 may store a program that is a set of various commands which are required to operate the function of the electronic apparatus 100. the storage 130 may be a Read-Only Memory (ROM), a Hard Disk Drive (HDD), a Solid State Disk (or drive, SSD), etc.

The controller 140 controls each component within the electronic apparatus 100. To be specific, when a turn-on command is input and power is supplied, the controller 140 boots a system by using an Operating System (O/S) stored in the storage 130 in response to a command stored in an embedded ROM. When the booting is completed, the controller 140 may perform a calculation operation (or service) corresponding to a user command which is inputted through the user interface 120. In addition, the controller 140 may control the user interface 120 to display a screen according to a calculation result.

When receiving information on a power state from the power supply 200 which will be described below, the controller 140 may control the user interface 120 to output a message corresponding to the received information. For example, when the power supply 200 notifies that an adapter is connected, the controller 140 may control the user interface 120 to turn on a status light to display that the adapter is connected. In addition, when the power supply 200 notifies that a battery pack 300 has a problem, the controller 140 may control the user interface 120 to display a message indicating that the battery pack 300 needs to be replaced.

The power supply 200 supplies power to each component within the electronic apparatus 100 by using power provided from an external source (for example, an adapter power) and power stored in the battery pack 300. When the adapter is connected, the power supply 200 may supply the power provided from the adapter to each component within the electronic apparatus 100. In this case, when a battery needs to be charged, the power supply 200 may charge one or more battery cells of the battery pack 300. When the adapter is not connected, the power supply 200 may supply the power charged in the battery pack to each component within the electronic apparatus 100. A configuration and operation of the battery pack 300 will be described below with reference to FIG. 2.

The power supply 200 may sense whether the battery cell has a problem, and if so, may allow the battery cell not to be charged, and notify the state to the controller 140. In addition, when a voltage of the battery cell is lower than the predetermined first voltage, even though the battery cell has a problem, the power supply 200 may charge the battery cell by using a micro charging current. Herein, the predetermined first voltage refers to a voltage level by which to determine whether the battery cell is over discharged, and may be 2.5V, for example. However, the predetermined first voltage is not limited thereto, may vary depending upon a type and a shape of a battery cell.

Figure 5:
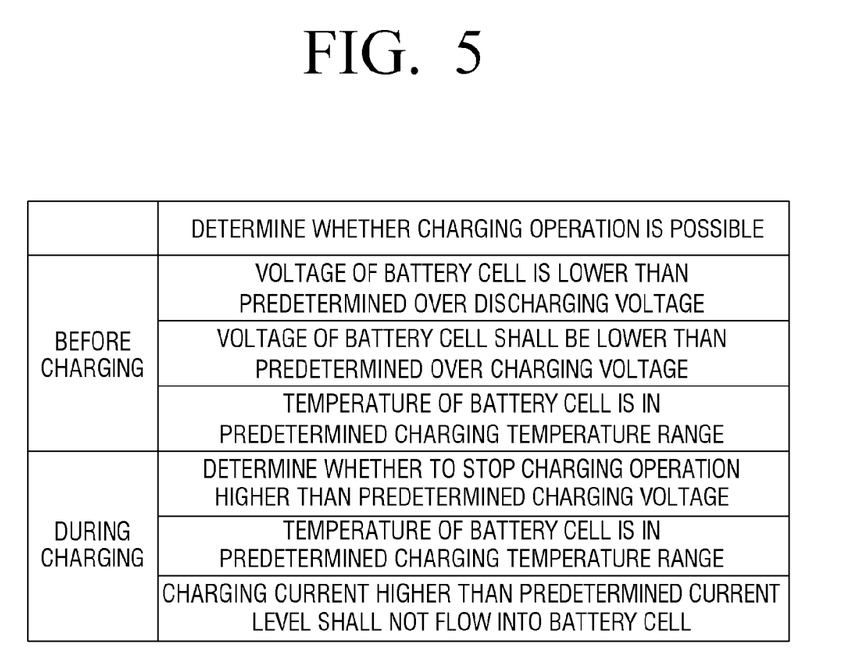
FIG. 5 is a diagram illustrating charging conditions of a battery pack according to an exemplary embodiment of the present general inventive concept.

Meanwhile, such a charging operation of the battery cells is executed only when the battery cell has a problem, and thus, may be executed under restricted conditions only. For example, when the voltage of the battery cell is lower than the predetermined first voltage, the battery cell may be charged only until the voltage of the battery cell reaches the second voltage which is higher than the first voltage, or only for a predetermined time, and only when a temperature of the battery cell is in a stable temperature range. Such charging conditions of the battery cell are illustrated in FIG. 5.

As described above, when the battery cell is over discharged, the electronic apparatus 100 according to the present exemplary embodiment may charge the battery cell by using a micro charging current even though the battery pack has a problem, and thus, may prevent deformation, for example, swelling, which may occur due to the over discharge.

Figure 2:
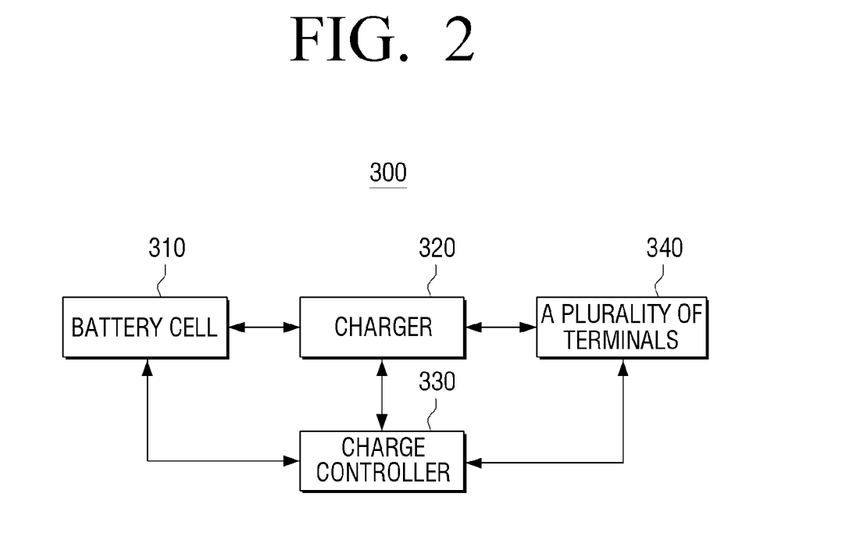
FIG. 2 is a block diagram illustrating a battery pack according to an exemplary embodiment of the present general inventive concept.

FIG. 2 is a block diagram illustrating a battery pack according to an exemplary embodiment of the present general inventive concept. The battery pack of FIG. 2 may correspond to the battery pack 300 of FIG. 1.

Referring to FIG. 2, the battery pack 300 includes a battery cell 310, a charger 320, a charge controller 330, and a plurality of terminals 340. The battery pack 300 may be fixedly mounted to the electronic apparatus 100 (that is, an embedded battery), or may be detachably mounted to the electronic apparatus 100 (that is, a detachable battery).

The battery cell 310 may be a secondary battery. The battery cell 310 is charged by the power provided from an external source, and outputs a charged electric power to an outside thereof (that is, to each component of the electronic apparatus 100). The battery cell 310 may be a lithium ion cell. Meanwhile, in an exemplary embodiment, although it is illustrated that the battery pack 300 includes one battery cell, the battery pack may be embodied to include a plurality of battery cells, and the plurality of battery cells may be arranged in various series/parallel forms.

The charger 320 is supplied with the power from the external source, and charges the battery cell 310 by using the supplied power. The charger 320 may charge the battery cell by using a high current (for example, 10 A), and may charge the battery cell by using the micro charging current (for example, tens (or scores) of mA to hundreds of mA) which is much lower than the high current. That is, when the battery cell 310 is in a normal condition (for example, a state where the battery cell has no problem), the charger 320 may charge the battery cell by using the high current, and when the battery cell is charged to a certain degree (for example, more than 95%) or when the battery cell is in the over discharge state which will be described below, the charger 320 may charge the battery cell by using the micro charging current. A configuration of the charger 320 will be described with reference to FIG. 3.

The charge controller 330 senses a state of the battery cell. The charge controller 330 may collect information on the power and the temperature of the battery cell 310, and determine whether the battery cell 310 has a problem and whether the battery cell needs to be charged based on the collected information.

When it is determined that the battery cell 310 has no problem and needs to be charged, the charge controller 330 may control the charger 320 to supply the power from the external source to the battery cell.

When it is determined that the battery cell 310 has a problem, the charge controller 330 may control the charger 320 not to charge the battery cell 310. However, only when the voltage of the battery cell is lower than a predetermined first voltage (for example, 2.5V), the charge controller 330 may control the charger 320 to charge the battery cell by using the micro charging current.

Such a charging operation is executed when the battery cell has a problem, and thus, is not executed when the temperature of the battery cell is not in a normal temperature range. In addition, the charge controller 330 may control the charger 320 to charge the battery cell for a certain period of time, until the voltage of the battery cell reaches a predetermined second voltage (for example, 3V). When a plurality of battery cells are connected to the battery pack 300 in series, a voltage of one of the plurality of battery cells is lower than the first voltage, and a voltage of another one of the plurality of battery cells is higher than a third voltage (that is, a voltage level by which to determine whether the battery cell is over discharged, for example, 4.2V), the charge controller 330 may control the charger 320 not to charge the battery cell.

The plurality of terminals 340 connect the charger 320 and the charge controller 330 to each component of the electronic apparatus 100. At least two of the plurality of terminals may be a terminal which is supplied with power from an external adapter, or supplies the power to each component within the electronic apparatus 100, and at least another two of the plurality of terminals may be a terminal for communicating with the controller 140.

As described above, when the voltage of the battery cell is lower than the predetermined voltage, the battery pack 300 according to the present exemplary embodiment charges the battery cell even though the battery cell has a problem, and thus, may prevent the deformation, such as swelling, due the over discharge.

Figure 3:
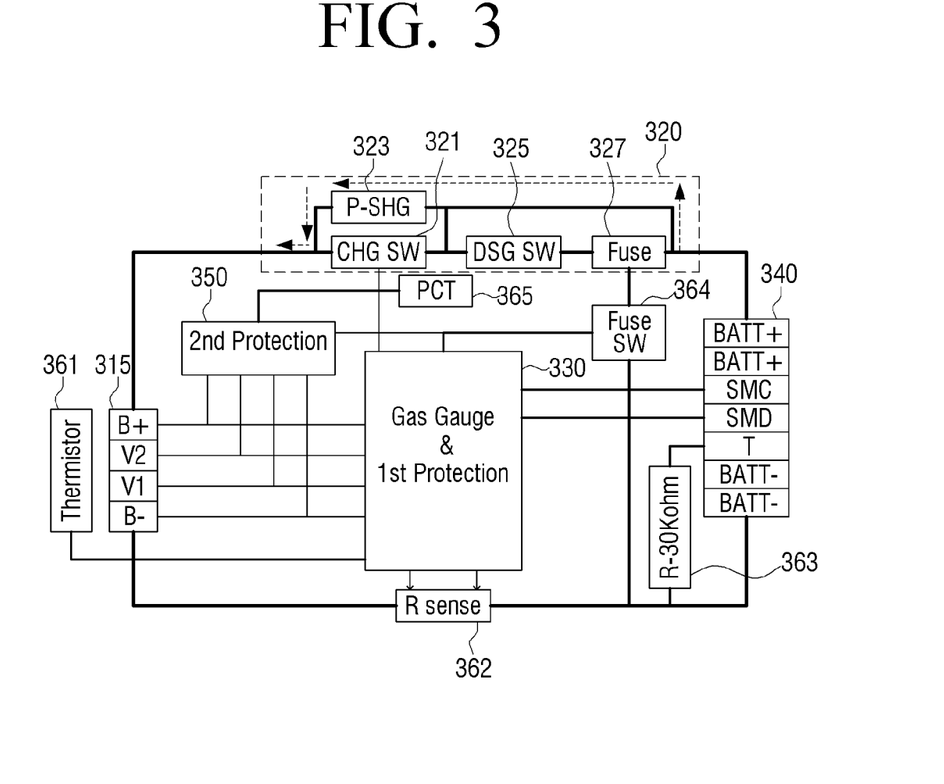
FIG. 3 is a circuit diagram illustrating a battery pack according to an exemplary embodiment of the present general inventive concept.

FIG. 3 is a circuit diagram illustrating a battery pack according to an exemplary embodiment of the present general inventive concept. The battery pack of FIG. 3 may correspond to the battery pack 300 of FIG. 1.

Referring to FIG. 3, the battery pack 300 includes a cell terminal 315, the charger 320, the charge controller 330 as a first charging controller, a second charging controller 350, the plurality of terminals 340, and various sensors 361, 362, 363, 364, and 365.

The cell terminal 315 refers to a terminal which connects the charger 320 and the battery cell electrically. The cell terminal 315 may provide the battery cell with a current provided from the charger 320, and provide the first charging unit 330 and the second charging unit 350 with a voltage level of the battery cell. The cell terminal 315 may include terminals B+ and B− and V1 and V2 connectable to the battery cells.

The charger 320 is supplied with the power from the external source, and charges the battery cell by using the supplied power. The charger 320 may include a first charging unit 321, a second charging unit 323, a discharger 325, and a fuse 327.

The first discharging unit 321 supplies a current of a level of a predetermined first current to the battery cell 310 by using the power from the external source. One end of the first charging unit 321 is connected to the fuse 327, and the other end of the first charging unit 321 is connected to the cell terminal 315 (that is, one end of the battery cell). In this case, the first current level may be a high current of about 10 A.

The second charging unit 323 supplies a current of a level of a predetermined second current to the battery cell 310 by using the power from the external source. One end of the second charging unit 323 is connected to one terminal which is supplied with power from among the plurality of terminals 340, and the other end of the second charging unit 323 is connected to the cell terminal 315 (that is, one end of the battery cell). In this case, the second current level may be a micro charging current which is lower than the first current level, and may be in a range of tens (or scores) of mA to hundreds of mA (for example, 10 mA to 999 mA).

The discharger 325 is an element to control a current discharge within the battery cell 310.

When the battery cell 310 has a problem, the fuse 327 cuts off power supply to the first charging unit 321.

When the battery cell 310 has a problem, the first charge controller 330 controls the fuse 327 not to supply the external power to the first charging unit 321. In addition, even when the battery cell 310 has a problem, the first charge controller 330 may control the second charging unit 323 to charge the battery cell 310 by using the micro charging current when the voltage of the battery cell 310 is lower than the predetermined first voltage, in order to prevent the over discharge of the battery cell 310.

The second charge controller 350 may sense a voltage state of the battery cell 310, and when the battery cell 310 has a problem (or when the problem of the battery cell 310 is sensed), may control the fuse 364 to operate. The second charge controller 350 is an additional protective component in a case where the first charge controller 330 having a first protection and a gas gauge function is out of order.

The plurality of terminals 340 are terminals for communicating with a terminal which is supplied with the power from the external source and the controller 140. Herein, an SMC and an SMD are terminals which communicate with the first charge controller 330 and the controller 140 by using a clock/data signal and transmit/receive information necessary for a charging operation and a discharging operation. The terminals BATT+ and BATT− may be connected to the battery cell 310 through the cell terminal 315 and corresponding components of the battery pack 300.

The various sensors 361, 362, 363, 364, and 365 are components to sense a temperature of the battery cell, a current which flows in the battery cell, etc. Herein, the sensor 361 is a thermistor which senses a temperature of the battery cell 310. The sensor 362 is an R sense as a resistor having a resistance usable to sense an amount of a current which flows in a circuit, and is used in a capacity calculation through a direct current integration. The sensor 363 is an R-30 Kohm as a resistor having a high resistance usable to sense whether the battery pack 300 is mounted, from an outside of the battery pack 300. The sensor 364 is a Fuse SW 364 as a switch element to control an operation state of the fuse 327, and the sensor 365 is a PTC 365 as a sensor to sense a temperature of the charger 320.

Figure 4:
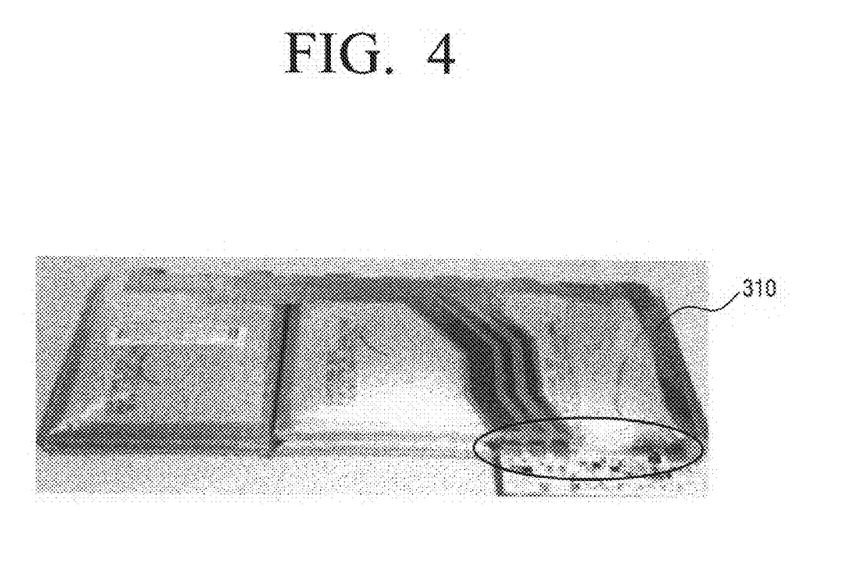
FIG. 4 is a view illustrating a shape of a swollen battery cell.

FIG. 4 is a diagram illustrating a shape of a swollen battery cell.

Referring to FIG. 4, when the battery cell 310 is swelled, a volume of the battery cell 310 increases. When the battery pack 300 is mounted to the electronic apparatus 100 (that is, an embedded battery) and the battery pack 300 is swelled up in a closed space, the battery pack 300 may damage a case of the electronic apparatus 100 and other components within the case.

FIG. 5 is a diagram illustrating charging conditions of a battery pack according to an exemplary embodiment of the present general inventive concept. The charging conditions of the battery pack of FIG. 5 may correspond to charging conditions of the battery pack 300 of the FIG. 1. The charging conditions may include charge starting conditions and charge halting conditions with respect to a battery cell having a problem.

When a battery cell has a problem, for example, a predetermined problem, a charging operation may be selected and/or executed only when one or more restrict conditions are satisfied. The charging operation of a battery cell having a problem may be executed only when the voltage of the battery cell is lower than the predetermined first voltage (for example, 2.5V), the voltage of the battery cell (any one of a plurality of battery cells) is lower than the predetermined third voltage (for example, 4.2V), and a temperature of the battery cell is in a range of a normal temperature range.

Even though the aforesaid conditions are satisfied and the charging operation is executed, the charging operation may be halted immediately when the over discharged battery cell is charged until its voltage gets higher than the predetermined second voltage (for example, 3V), the temperature of the battery cell exceeds the normal temperature range, and a current which is higher than a predetermined current value flows into the battery cell.

Meanwhile, the battery pack may include a plurality of battery cells, and an operation of the charge controller when the battery pack includes a plurality of battery cells will be described below with reference to FIGS. 6 to 8.

Figure 6:
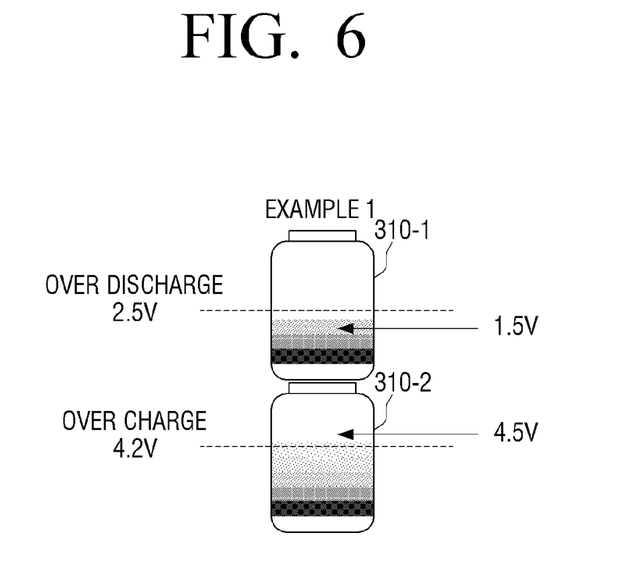
FIGS. 6 to 8 are diagrams illustrating operations of a charge controller of FIG. 3 according to an exemplary embodiment of the present general inventive concept.
Figure 7:
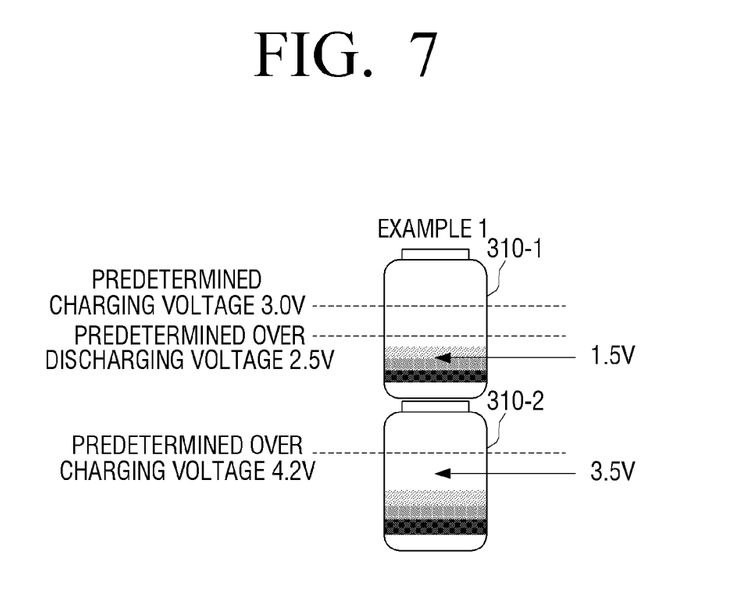
Figure 8:
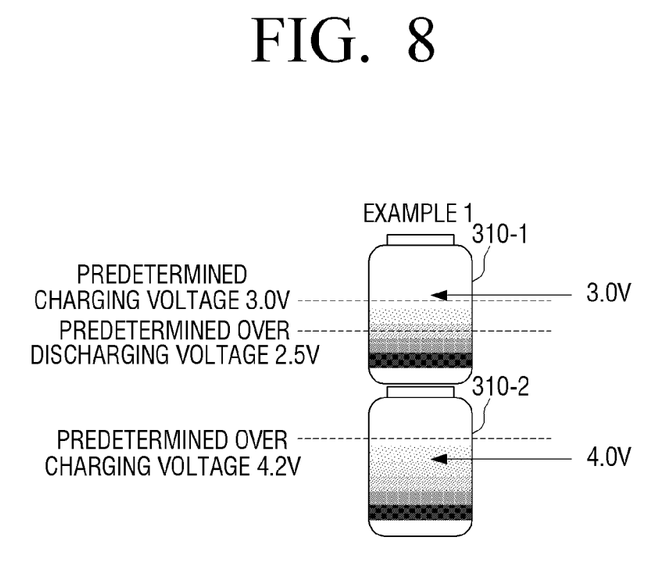

FIGS. 6, 7, and 8 are diagrams illustrating operations of the charge controller 330 and/or 350 of FIG. 3 according to an exemplary embodiment of the present general inventive concept. FIGS. 6, 7 and 8 illustrates a battery pack including two battery cells which are connected in series, for example.

Referring to FIG. 6, one battery cell 310-1 is over discharged, and the other battery cell 310-2 is over charged. That is, the battery cell 310-1 which is over discharged needs to be charged. However, the charging operation for the other battery cell 310-2 is not executed for stability since the battery cell 310-2 is over charged.

Referring to FIG. 7, one battery cell 310-1 is over discharged, and the other battery cell 310-2 is in a normal state where the battery cell is not over charged. In this case, the battery cells 310-1 and 310-2 satisfy the charge starting conditions of FIG. 5, and thus, the charging operation is executed by using the micro charging current.

Through such an operation, the charging operation for battery cells 310-1 and 310-2 is executed, and when the voltage of the battery cell 310-1 reaches the predetermined second voltage, the charging operation is halted.

Referring to FIG. 8, the battery cells 310-1 and 310-2 are charged to 3.0V and 4.0V, respectively, and thus the charge controller 140 and/or the charge controller 330 and/or 350 may determines whether to perform a charging operation on the battery cells 310-1 and 310-2 according to the conditions of FIG. 5.

Although it was described that the charging operation is halted when the voltage of the battery cell 310 reaches the predetermined second voltage, the charging operation may be halted when the predetermined charging time (for example, 20 minutes) elapses or the temperature of the battery cell exceeds the normal temperature range, for example.

Figure 9:
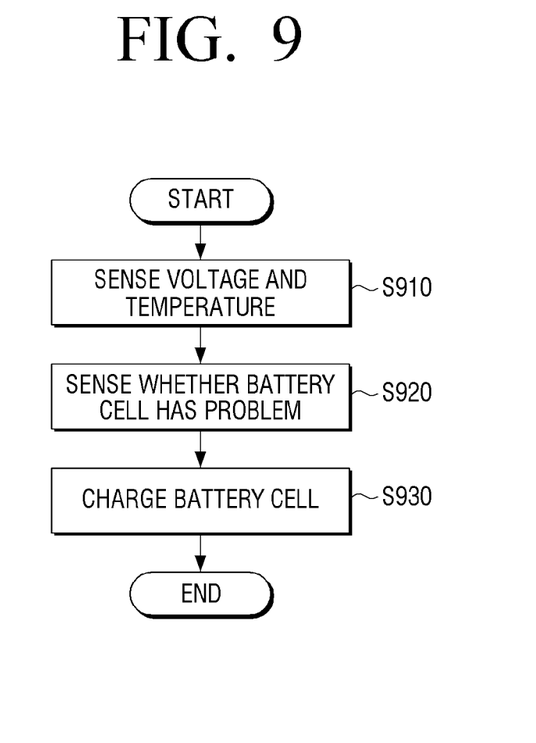
FIG. 9 is a flow chart illustrating a method of controlling charging a battery cell according to an exemplary embodiment of the present general inventive concept.

FIG. 9 is a flow chart illustrating a method of controlling charging a battery cell according to an exemplary embodiment of the present general inventive concept.

Referring to FIG. 9, a voltage and a temperature of a battery cell are sensed at operation S910.

It is determined whether the battery cell has a problem based on the sensed voltage and/or temperature at operation S920. It may be determined that the battery cell has a problem (defect or malfunctional event) by sensing a voltage corresponding to a determination of whether the battery cell is over charged (for example, 4.5V) or a voltage corresponding to a determination of whether the battery cell is over discharged (for example, 2V), or a temperature corresponding to a determination of whether the battery cell is exposed to a high temperature.

The battery cell is selectively charged depending upon the determined result at operation S930. When it is determined that the battery cell has no problem and is not fully charged, the battery cell may be charged. However, when it is determined that the battery cell has a problem or is fully charged, the battery cell is not charged. When the voltage of the battery cell is lower than the predetermined first voltage, the battery cell may be charged by using the micro charging current even though the battery cell has a problem.

By the method of controlling charging a battery cell according to the present exemplary embodiment, the charging operation is executed when a voltage of the battery cell is lower than the predetermined first voltage even though the battery cell has a problem, and thus, the deformation, for example, swelling, occurring due to the over discharge may be prevented. The method of FIG. 9 may be executed in an electronic apparatus having the configuration of FIG. 1 or a battery pack having the configuration of FIG. 2, and may be executed on an electronic apparatus or a battery pack having other configuration.

In addition, the method of controlling charging a battery cell as described above may be embodied as a program (or an application) including an algorithm which is executable on a computer, and the program may be stored and provided in a non-transitory computer readable recording medium.

The non-transitory computer readable recording medium refers to a medium which may store data semi-permanently rather than storing data for a short time such as a register, a cache, and a memory and may be readable by an apparatus. Specifically, the above-described various applications and programs may be stored in the non-transitory recordable medium like a compact disc (CD), a digital versatile disk (DVD), a hard disk, a Blu-ray disk, a universal serial bus (USB), a memory card, and a read-only memory (ROM), etc., and provided therein.

Figure 10:
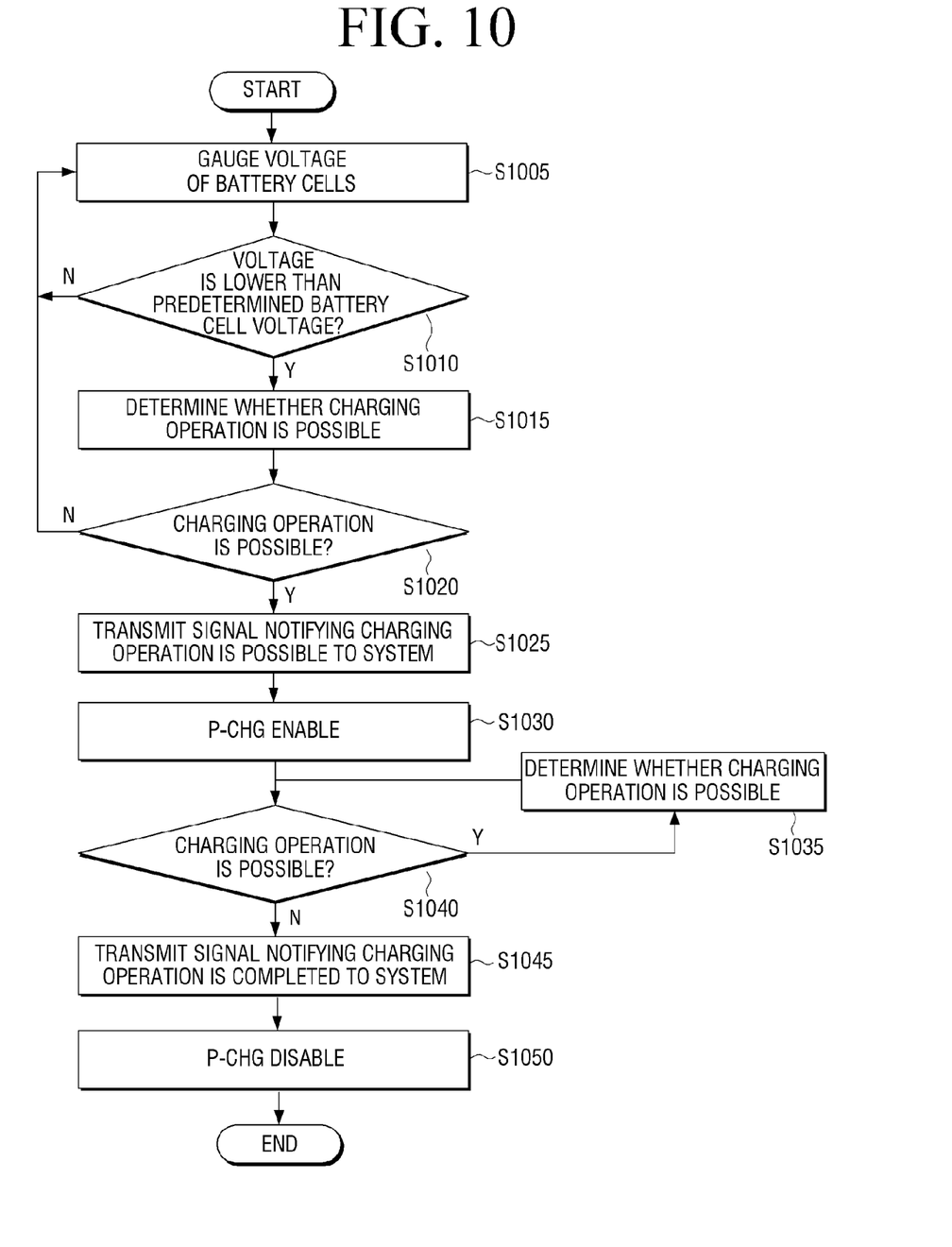
FIG. 10 is a flow chart illustrating a charging operation of FIG. 9 according to an exemplary embodiment of the present general inventive concept.

FIG. 10 is a flow chart illustrating a charging operation of the method of FIG. 9 according to an exemplary embodiment of the present general inventive concept.

Referring to FIG. 10, the battery cell is determined to have a problem. In this state, a voltage of the battery cell is sensed at operation S1005, and it is determined whether the voltage of the battery cell is lower than the predetermined first voltage at operation S1010.

When it is determined that the voltage of the battery cell is lower than the first voltage at operation S1010-Y, it is determined whether the battery cell may be charged at operation S1015. It may be determined whether a temperature of the battery cell is in a temperature range where the charging operation is possible and whether there is other battery cell which is over charged.

When it is determined that the charging operation for the over discharged battery cell is possible at operation S1020-Y, execution of the charging operation is notified to a system at operation S1025, and a second charging unit P-CHG may be operated to provide the battery cell with the micro charging current at operation S1030.

When it is determined that the voltage of the battery cell exceeds the first voltage at operation S1010-N or the battery cell is not in a state where the charging operation is possible, it is continuously monitored whether the battery cell enters into a state where the charging operation is possible.

When the over discharged battery cell is started to be charged by the second charging unit, it may be sensed in real time whether charge halting conditions are satisfied at operations S1035 and S1040. It may be sensed whether the voltage of a first battery cell gets higher than the second voltage for a predetermined time, the predetermined time elapsed, the temperature of the battery cell exceeds a temperature range where the charging operation is possible, and the like.

When the voltage of the over discharged battery cell reaches the second voltage or the predetermined time elapsed at operation S1040-N, a state of charging completion is notified to a system at operation S1045, and an operation of the second charging unit P-CHG may be halted at operation S1050.

By the method of charging a battery pack according to the present exemplary embodiment, the charging operation is executed when the voltage of the battery cell is lower than a predetermined voltage even though the battery pack has a problem, and thus, the deformation, for example, swelling, occurring due to the over discharge may be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A battery pack to supply power to an electronic apparatus, comprising:
   a battery cell;
   a charger configured to receive power from an external source and to charge the battery cell by using the supplied power; and
   a charge controller configured to control the charger to charge the battery cell when a voltage of the battery cell is lower than a predetermined first voltage even though the battery cell has a problem.

2. The battery pack of claim 1, wherein when the voltage of the battery cell is lower than the predetermined first voltage, the charge controller controls the charger to charge the battery cell only until the voltage of the battery cell reaches a predetermined second voltage which is higher than the predetermined first voltage.

3. The battery pack of claim 1, wherein when the voltage of the battery cell is lower than the predetermined first voltage, the charge controller controls the charger to charge the battery cell only for a predetermined time.

4. The battery pack of claim 1, wherein only when the voltage of the battery cell is lower than the predetermined first voltage, and a temperature of the battery cell is in a predetermined temperature range, the charge controller controls the charger to charge the battery cell.

5. The battery pack of claim 4, wherein the charge controller determines whether the battery cell has the problem based on the voltage and the temperature of the battery cell.

6. The battery pack of claim 1, wherein:
   the battery pack comprises a plurality of battery cells connected to each other in series; and
   even when a voltage of at least one of the plurality of battery cells is lower than the predetermined first voltage, and when a voltage of at least one of other battery cells is higher than a predetermined third voltage, the battery pack controls the charger not to charge the plurality of battery cells.

7. The battery pack of claim 1, wherein:
   the charger comprises:
   a first charging unit configured to supply a current to the battery cell by a predetermined first current level by using the power from the external source,
   a second charging unit configured to supply a current to the battery cell by a second current level which is lower than the predetermined first current level, by using the power from the external source, and a fuse configured to, when the battery cell has the problem, cut off power supply to the first charging unit;

when the battery cell has the problem, the charge controller controls the fuse not to supply external power to the first charging unit; and when the voltage of the battery cell is lower than the predetermined first voltage even though the battery cell has the problem, the charge controller controls the second charging unit to charge the battery cell.

8. The battery pack of claim 7, wherein the second charging unit outputs a current in a range of 10 mA to 999 mA.

9. The battery pack of claim 7, further comprising:
a second charge controller configured to control the fuse not to supply external power to the first charging unit when the battery cell satisfies a predetermined condition.

10. The battery pack of claim 7, further comprising:
a plurality of terminals configured to receive power from the external source,
wherein the first charging unit comprises one end which is connected to one end of the fuse and the other end which is connected to one end of the battery cell,
wherein the second charging unit comprises one end which is connected to one of the plurality of terminals and the other end which is connected to the one end of the battery cell, and
wherein the battery cell comprises the other end which is connected to another one of the plurality of terminals.

11. The battery pack of claim 1, wherein the battery cell is a lithium ion cell.

12. An electronic apparatus comprising:
a user interface configured to receive a user command;
a controller configured to control the user interface to perform a calculation according to the received user command, and to display the calculation on a screen; and
a power supply configured to supply power to the user interface and the controller by using power provided from an external source and power charged in a battery pack,
wherein when a voltage of a battery cell in the battery pack is lower than a predetermined first voltage even though the battery cell has a problem, the battery pack charges the battery cell.

13. The electronic apparatus of claim 12, wherein the battery pack comprises:
the battery cell;
a first charging unit configured to supply a current to the battery cell by a predetermined first current level by using the power provided from the external source;
a second charging unit configured to supply a current to the battery cell by a second current level, which is lower than the predetermined first current level, by using the power provided from the external source;
a fuse configured to, when the battery cell has a problem, cut off power supply to the first charging unit; and a charge controller configured to, when the battery cell has a problem, control the fuse not to supply external power to the first charging unit, and when the voltage of the battery cell is lower than the predetermined first voltage even though the battery cell has a problem, control the second charging unit to charge the battery cell.

14. The electronic apparatus of claim 13, wherein when the voltage of the battery cell is lower than the predetermined first voltage, the charge controller controls the second charging unit to charge the battery cell only until the voltage of the battery cell reaches a predetermined second voltage which is higher than the predetermined first voltage.

15. The electronic apparatus of claim 13, wherein:
the battery pack comprises a plurality of battery cells connected to each other in series; and
even when a voltage of at least one of the plurality of battery cells is lower than the predetermined first voltage, and when a voltage of at least one of other battery cells is higher than a predetermined third voltage, the charge controller controls the first charging unit and the second charging unit not to charge the plurality of battery cells.

16. The electronic apparatus of claim 13, wherein when the battery cell malfunctions, the charge controller notifies a malfunction problem of the battery cell to the controller.

17. A method of controlling charging a battery pack to supply power to an electronic apparatus, the method comprising:
sensing a voltage and a temperature of a battery cell in the battery pack;
determining whether the battery cell has a problem based on the sensed voltage and the sensed temperature; and
selectively charging the battery cell according to whether the battery cell has a problem,
wherein when the voltage of the battery cell is lower than a predetermined first voltage even though the battery cell has the problem, the selectively charging comprises charging the battery cell.

18. The method of claim 17, wherein when the voltage of the battery cell is lower than the predetermined first voltage, the selectively charging comprises charging the battery cell only until the voltage of the battery cell reaches a predetermined second voltage which is higher than the predetermined first voltage.

19. The method of claim 17, wherein when the voltage of the battery cell is lower than the predetermined first voltage, the selectively charging comprises charging the battery cell only for a predetermined time.

20. The method of claim 17, wherein:
the battery pack comprises a plurality of battery cells connected to each other in series; and
when a voltage of at least one of the plurality of battery cells is lower than the predetermined first voltage, and a voltage of at least one of other battery cells is higher than a predetermined third voltage, the selectively charging comprises not charging the plurality of battery cells.

* * * * *